(12) United States Patent
Pastwa et al.

(10) Patent No.: US 6,501,033 B2
(45) Date of Patent: Dec. 31, 2002

(54) SERVICEABLE STEERING COLUMN MODULE (SCM)

(75) Inventors: Conrad M. Pastwa, Orion Township, MI (US); Joseph E. Khoury, Farmington, MI (US); Steven R. Hoskins, Walled Lake, MI (US)

(73) Assignee: Methode Electronics, Inc., Chicago, IL (US)

( * ) Notice: Subject to any disclaimer, the term of this patent is extended or adjusted under 35 U.S.C. 154(b) by 0 days.

(21) Appl. No.: 09/579,734

(22) Filed: May 26, 2000

(65) Prior Publication Data

US 2002/0134610 A1 Sep. 26, 2002

(51) Int. Cl.[7] ................................................ H01H 9/00
(52) U.S. Cl. .................................. 200/61.27; 200/61.54
(58) Field of Search ............................ 200/61.54, 61.27

(56) References Cited

U.S. PATENT DOCUMENTS

| | | | | |
|---|---|---|---|---|
| 5,704,633 A | * | 1/1998 | Durrani et al. | 280/728.2 |
| 5,762,507 A | * | 6/1998 | Mochizuki et al. | 439/164 |
| 5,766,019 A | * | 6/1998 | Matsumoto et al. | 439/15 |
| 5,769,649 A | | 6/1998 | Welschholz et al. | 439/164 |
| 5,883,348 A | * | 3/1999 | Yokoyama | 200/61.54 |
| 5,906,120 A | * | 5/1999 | Thacker et al. | 70/186 |
| 5,944,534 A | * | 8/1999 | Hoffman et al. | 439/15 |
| 5,977,494 A | * | 11/1999 | Sano et al. | 200/61.54 |
| 6,103,980 A | * | 8/2000 | Gauthier | 200/61.27 |
| 6,127,638 A | * | 10/2000 | Masuda et al. | 200/61.27 |
| 6,145,402 A | * | 11/2000 | Nishitani et al. | 74/484 R |
| 6,225,582 B1 | * | 5/2001 | Stadler et al. | 200/61.27 |
| 6,236,004 B1 | * | 5/2001 | Stadler et al. | 200/61.28 |
| 6,246,128 B1 | * | 6/2001 | Sugata | 307/10.1 |

* cited by examiner

*Primary Examiner*—Eric Culbreth
*Assistant Examiner*—L. Lum
(74) *Attorney, Agent, or Firm*—Blankrome Comisky & McCauley LLP

(57) ABSTRACT

A modular steering column device includes a lock housing, a primary switch module, a secondary switch module, an electronics module, a clockspring, and an ignition switch. The lock housing is removeably attachable to a steering column of a vehicle. The primary switch module is removeably attachable to the lock housing. The secondary switch module is removeably attachable to the primary switch housing and to the lock housing. The electronics module is removeably attachable to the lock housing. The clockspring is removeably attachable to the primary switch module. The ignition switch is removebaly attachable to the lock housing. The modularity of the serviceable steering column module design provides for the easy replacement of defective, worn-out, or broken modules, or to replace functioning modules with an upgraded, premium module. Furthermore, standard components can be swapped-out between different brands of vehicles. While non-standard modules can be specially designed for specially branded vehicles where the non-standard modules are compatible and attachable with the standard modules.

18 Claims, 1 Drawing Sheet

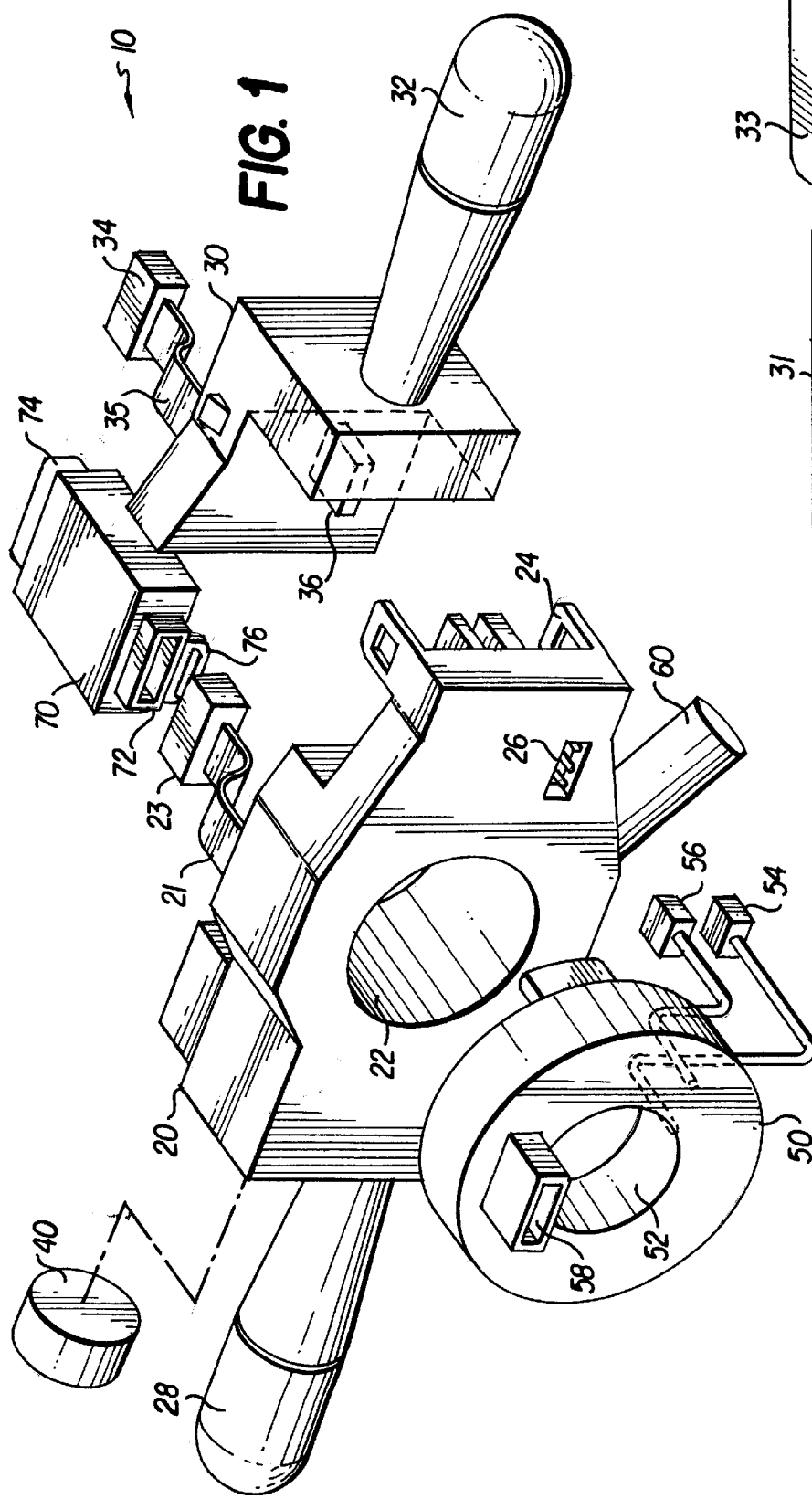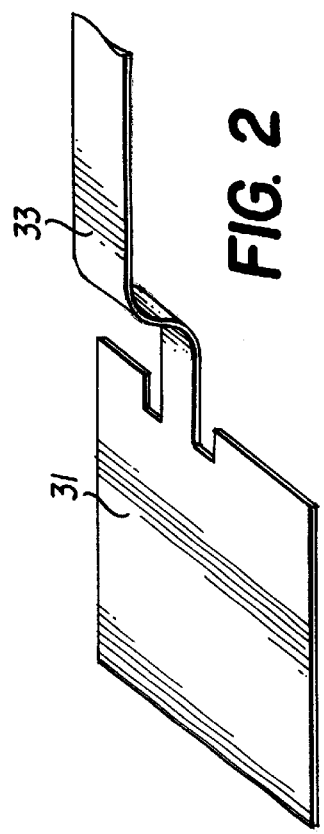

SERVICEABLE STEERING COLUMN MODULE (SCM)

BACKGROUND OF THE INVENTION

1. Field of the Invention

The present invention pertains to devices mounted on a steering column of a vehicle. The invention more particularly concerns a modular steering column device.

2. Discussion of the Background

Automotive manufacturers are motivated to purchase components at the lowest cost and to assemble those components for the lowest cost while producing a vehicle that appeals to the consumer market which can be sold at a profit. Vehicles that appeal to the consumer market, typically, are vehicles that are well built, are easy to maintain, and are sold for a reasonable price. Thus, automotive manufacturers are financially motivated to provide consumers with high quality, low cost, vehicles.

Automotive manufacturers can reduce costs by eliminating parts, thus reducing inventory. Furthermore, automotive manufacturers can lower assembly costs if the components are easy to assemble. Additionally, automotive manufacturers can lower costs by using parts which are interchangeable between different models of vehicles. Thus, automotive manufacturers can buy components in bulk, which adds to the cost savings.

Consumers are directly impacted by the components used and the assembly techniques employed by automotive manufacturers. Parts which are easily replaced or repaired, and vehicles which are easily serviced, reduce the cost of maintaining the consumers' vehicles.

Therefore, there is a need for components which are inexpensive to produce and which are easy to assemble, while at the same time are easily serviced during maintenance and/or repair.

SUMMARY OF THE INVENTION

Therefore, it is an object of the present invention to provide automotive components which can be installed on many different models of vehicles.

It is still another object of the invention to provide automotive components which are easy to install.

Yet another object of the invention is to provide automotive components which are easily serviced.

In one form of the invention, the modular steering column device includes a lock housing removably attached to a steering column of a vehicle, and a primary switch module removably attached to the lock housing.

The modular steering column device can also include a secondary switch module, a clockspring, and ignition switch, and an electronics module. The secondary switch module is removably attached to the lock housing and is also removably attached to the primary switch housing. The clockspring is removably attached to the primary switch module. The ignition switch is removably attached to the lock housing. The electronics module is removably attached to the lock housing.

In another form embodiment, the invention takes the form of a vehicle incorporating the elements of the modular steering column device.

The modular components of the device of the invention can be bought in quantity; thus, lowing part costs. The modular components of the device of the invention can be assembled into the steering columns of many different models of vehicles; thus, achieving interchangeability and lowering assembly and inventory costs. The modular components of the device of the invention facilitate maintenance since the entire modular steering column device need not be removed to repair and/or replace a non-operative module; thus, repair costs are lowered.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is an exploded perspective view of the serviceable steering column module device; and FIG. 2 is a partial perspective view of a flexible circuit.

DETAILED DESCRIPTION OF THE PRESENTLY PREFERRED EMBODIMENTS

Referring now to the drawings, wherein like reference numerals designate identical or corresponding parts throughout the several views, and more particularly to FIG. 1 thereof, an embodiment of the present invention is a modular steering column device 10.

FIG. 1 is an exploded perspective view of the modular steering column device 10. The modular steering column device 10 includes a primary switch module 20, a secondary switch module 30, an ignition switch 40, a clockspring 50, a lock housing 60, and an electronics module 70. The lock housing 60 is attached to a steering column (not shown) of a vehicle (not shown). The attachment of the lock housing 60 to the steering column allows for repeated attachment and disattachment of the lock housing 60 to and from the steering column by means known in the art.

The primary switch module 20 is attached to the lock housing 60. The attachment of the primary switch module 20 to the lock housing 60 allows for repeated attachment and disattachment of the primary switch module 20 to and from the lock housing 60 by means known in the art. To access the lock housing 60 a portion of the steering column (not shown) known as a column shroud (not shown) must be removed so as to expose the lock housing 60 which is attached to the steering column.

The locking housing 60 of the vehicle is well known in the art and will not be extensively reviewed. In short, the locking housing 60 includes a locking device (not shown) which is engageable with the steering shaft so as to prevent rotation of a steering wheel (not shown) attached to the steering shaft when the locking device is engaged with the steering shaft. In an un-locked position, such as when the vehicle is being operated, the locking device does not engage the steering shaft. The lock housing 60 also provides mounting points for the secondary switch module 30, the electronics module 70, and the ignition switch 40. The lock housing 60 can be made of a polymer material, a die cast metal, or a polymer molded over a die cast substrate. Furthermore, in yet another embodiment, the lock housing 60 can form the primary switch module 20.

The primary switch module 20 includes a wire harness 21 having a connector 23, a connector 26, a stalk for housing a turn signal activation device 28, and an aperture 22 through which passes a steering shaft (not shown) of the vehicle. The primary switch module 20 contains the entire switch mechanics and electrical contacts for the turn signal activation device 28. The primary switch module 20 extends past a centerline of the steering shaft. A detent mechanism of the switch mechanism is positioned across the centerline from the stalk; thus, the stalk has a long lever arm which has significant mechanical advantage and improved tactile features. Other switch functions may also be mounted on the stalk or substituted for the turn signal activation device 28. The primary switch module 20 provides mounting locations for both the clockspring 50 and the secondary switch module 30.

The secondary switch module 30 attaches to the lock housing 60 and to the primary switch module 20 via attachment brackets 24, 36 formed on both modules. The brackets 24, 36 can snap together, be secured together by a pin, be secured together by a press fit, or by other some other method that provide for multiple attachments and disattachments. The attachment of the secondary switch module 30 to the primary switch module 20 provides for a more rigid over-all structure since both modules 20, 30 are also attached to the lock housing 60. The attachment of the secondary switch module 30 to the lock housing 60 is similar to the attachment of the primary switch module 20 to the lock housing 60 and is not further discussed.

The secondary switch module 30 includes a wire harness 35 having a connector 34, and a stalk for housing a windshield wiper activation device 32. The secondary switch module 30 contains the entire switch mechanics and electrical contacts for the windshield wiper activation device. Other functions may be integrated into the stalk or substituted for the windshield wiper activation device 32. The windshield wiper activation device 32 includes a flexible circuit 32 (see FIG. 2) which conveys electricity from the device 32 to conductor of the wire harness 35. The flexible circuit 32 is made of flexible circuitry that flexes and bends so as to allow the windshield wiper activation device 32 to be rotated, translated, and pushed; thus, no slip rings are necessary. One end 31 of the flexible circuitry is attached to the windshield wiper activation device 32 and another end 33 is electrically connected to conductors of the wire harness 35. The stalk 28 of the primary switch module 20 can also incorporate the use of flexible circuitry.

The ignition switch 40 is attached to the lock housing 60 by means known in the art such as fastening devices, bayonet mounting, etc. The attachment of the ignition switch 40 to the lock housing 6 allows for repeated attachment and disattachment of the ignition switch 40 to and from the lock housing 60 by means known in the art. The ignition switch 40 accepts a key (not shown) which when rotated causes the ignition switch 40 to deliver an electrical signal to the starter motor (not shown).

The clockspring 50 is attached or mounted to the primary switch module 20 by means known in the art such as fastening devices, slip fits, anti-rotation tangs, clips, etc. One such clockspring is described in U.S. Pat. No. 6,012,935 which is hereby incorporated herein by reference. The clockspring 50 has one wire harness 54 and another wire harness 56 both of which connect with connector 26 of the primary switch module 20. The clockspring 50 has another connector 58 for providing a removeable connection with devices mounted on the steering wheel of the vehicle.

The electronics module 70 has a connectors 72, 76 at one end and another connector 74 at another end of the electronics module 70. Connector 72 attaches to connector 23 of the primary switch module 20. Thus, the primary switch module 20 re-conveys electrical signals from the clockspring 50 to the electronics module 70. Connector 76 attaches to connector 34 of the secondary switch module 30. Connector 74 attaches to a connector of the vehicles electronic system. Due to the length of the wire harness 21, the electronics module 70 can be position away from the primary switch module 20 in a place which is not as congested with components and devices. The electronics module 70 contains signal conditioning hardware which can be made specifically for a single model of a vehicle or can be standardized and used for all product offerings of a manufacturer. The electronics module 70 contains all of the necessary electronics required to interface with the electrical system or architecture of the vehicle. Additionally, based on the vehicle's platform, the electronics module 70 can be placed in many locations. Physicaly, the electronics module 70 attaches to the lock housing 60 in a repeatable, removeable manner, similar to that described above in regard to other components attached to the lock housing 60. Therefore, separation of the electronics module 70 allows for the separate servicing, repair, or replacement of the electronics module 70 without necessitating the removal of the other modules.

In another embodiment, the invention is a vehicle having the modular steering column device 10 attached thereto. Vehicles are well understood and will not be review in detail nor will figures be shown. Vehicles typically include a chassis to which an engine is mounted. Wheels are rotatably attached to the chassis and the engine is operably connected to at least one of the wheels. A steering shaft is operably connected to at least one of the wheels. A steering wheel is attached to the steering shaft. A steering column is attached to the chassis and substantially surrounds a portion of the steering shaft. The steering wheel includes an airbag, where the airbag is connected to the clockspring 50 of the modular steering column device 10.

Obviously, numerous modifications and variations of the present invention are possible in light of the above teachings. It is therefore to be understood that within the scope of the appended claims, the invention may be practiced otherwise than as specifically described herein.

What is claimed is:

1. A modular steering column device comprising:
   a lock housing removably attached to a steering column of a vehicle;
   a primary switch module removably attached to the lock housing; and
   a secondary switch module removably and independently attached to the primary switch module and to the lock housing.

2. A modular steering column device comprising:
   a lock housing removably attached to a steering column of a vehicle;
   a primary switch module removably attached to the lock housing;
   a secondary switch module removably and independently attached to the primary switch module and to the lock housing;
   a clockspring removably attached to the primary switch module; and
   an electronics module removably attached to the lock housing.

3. The modular steering column device according to claim 2 wherein the primary switch module has a first mounting bracket.

4. The modular steering column device according to claim 3 wherein the secondary switch module has a second bracket complementary to the first bracket of the primary switch module.

5. The modular steering column device according to claim 2 wherein the primary switch module includes a first wire harness having a first connector.

6. The modular steering column device according to claim 5 wherein the primary switch module includes a first stalk for housing a turn signal activation device.

7. The modular steering column device according to claim 6 wherein the first stalk of the primary switch housing includes a first flexible circuit made of flexible circuitry so as to connect the turn signal activation device directly to conductors of the first wire harness.

8. The modular steering column device according to claim 5 wherein the secondary switch module includes a second wire harness having a second connector.

9. The modular steering column device according to claim 8 wherein the secondary switch module includes a second stalk for housing a windshield wiper activation device.

10. The modular steering column device according to claim 9 wherein the second stalk of the primary switch housing includes a second flexible circuit made of flexible circuitry so as to connect the windshield wiper activation device directly to conductors of the second wire harness.

11. The modular steering column device according to claim 8 wherein the electronics module includes a third connector for providing a removable connection with the first connector of the primary switch module, and wherein the electronics module includes a fourth connector for providing a removable connection with the second connector of the secondary switch module.

12. The modular steering column device according to claim 11 wherein the electronics module includes a fifth connector for providing a removable connection with an electrical system of the vehicle.

13. The modular steering column device according to claim 12 wherein the primary switch module includes a first stalk for housing a turn signal activation device.

14. The modular steering column device according to claim 13 wherein the first stalk of the primary switch housing includes a first flexible circuit made of flexible circuitry so as to connect the turn signal activation device directly to conductors of the first wire harness.

15. The modular steering column device according to claim 14 wherein the secondary switch module includes a second stalk for housing a windshield wiper activation device.

16. The modular steering column device according to claim 15 wherein the second stalk of the primary switch housing includes a second flexible circuit made of flexible circuitry so as to connect the windshield wiper activation device directly to conductors of the second wire harness.

17. The modular steering column device according to claim 2 wherein the clockspring includes a third wire harness and a fourth wire harness, wherein the third wire harness is removably attached with the primary switch module and the fourth wire harness is removably attached with the primary switch module.

18. The modular steering column device according to claim 17 wherein the clockspring includes a sixth connector for providing a removable connection with devices located on a steering wheel of the vehicle.

* * * * *